（12） United States Patent
Hong et al.

(10) Patent No.: US 11,035,710 B2
(45) Date of Patent: Jun. 15, 2021

(54) METHOD FOR MEASURING FLOW USING ELECTROMAGNETIC RESONANCE PHENOMENON AND APPARATUS USING THE SAME

(71) Applicant: ELECTRONICS AND TELECOMMUNICATIONS RESEARCH INSTITUTE, Daejeon (KR)

(72) Inventors: Hyo-Bong Hong, Daejeon (KR); Jae-Chan Jong, Daejeon (KR); Seung-Min Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 131 days.

(21) Appl. No.: 16/554,326

(22) Filed: Aug. 28, 2019

(65) Prior Publication Data

US 2020/0080879 A1    Mar. 12, 2020

(30) Foreign Application Priority Data

Sep. 7, 2018  (KR) .................. 10-2018-0107112
Jul. 8, 2019   (KR) .................. 10-2019-0081858

(51) Int. Cl.
  *G01F 1/716*  (2006.01)
(52) U.S. Cl.
  CPC .................... *G01F 1/716* (2013.01)
(58) Field of Classification Search
  CPC .......................................... G01F 1/716
  See application file for complete search history.

(56) References Cited

U.S. PATENT DOCUMENTS 6,657,441 B2 * 12/2003 Gasch .................. G01F 1/663
                                              324/639
10,143,948 B2   12/2018 Bonifas et al.
(Continued)

FOREIGN PATENT DOCUMENTS

KR      200119602 Y1    7/1998
KR        0125883 Y1    3/1999
(Continued)

OTHER PUBLICATIONS

Hong-Tark Kim et al., "Optimal Design of Flow Measurement System Using Turbine Flowmeter", Journal of the KIECS., Feb. 2018, pp. 77-84, vol. 13, No. 1.

*Primary Examiner* — Gregory H Curran (57) ABSTRACT

Disclosed herein are a method and apparatus for measuring flow using an electromagnetic resonance phenomenon. The flowmeter includes an RF resonator in the form of a cylinder into which a transmission antenna for forming a magnetic field in a preset frequency range and a reception antenna for measuring a response signal are inserted, the RF resonator being shielded from an external magnetic field; and a processor for measuring the flow in a pipe that passes through the RF resonator based on the response signal. The RF resonator includes circular holes in the two bases of the cylinder so as to enable the pipe to pass through the RF resonator, and is formed with a first body and a second body, which are split in the height direction of the cylinder and are coupled using a coupling member so as to wrap the outer circumferential surface of the pipe.

20 Claims, 10 Drawing Sheets

(56) References Cited

U.S. PATENT DOCUMENTS

| | | |
|---|---|---|
| 2007/0124091 A1 | 5/2007 | Wee |
| 2014/0088930 A1 | 3/2014 | Kim et al. |
| 2015/0241492 A1 | 8/2015 | Lee et al. |
| 2015/0346126 A1* | 12/2015 | Jakkula .................. G01R 27/28 324/637 |
| 2016/0123899 A1* | 5/2016 | Harrison ............ G01N 33/2823 324/634 |

FOREIGN PATENT DOCUMENTS

| | | |
|---|---|---|
| KR | 200484480 Y1 | 9/2017 |
| KR | 300940877 S | 1/2018 |
| KR | 20180031784 A | 3/2018 |

\* cited by examiner

FIG. 12

METHOD FOR MEASURING FLOW USING ELECTROMAGNETIC RESONANCE PHENOMENON AND APPARATUS USING THE SAME

CROSS REFERENCE TO RELATED APPLICATIONS

This application claims the benefit of Korean Patent Application No. 10-2018-0107112, filed Sep. 7, 2018, and No. 10-2019-0081858, filed Jul. 8, 2019, which are hereby incorporated by reference in their entireties into this application.

BACKGROUND OF THE INVENTION

1. Technical Field

The present invention relates generally to technology for measuring flow, and more particularly to technology for measuring flow using a flowmeter based on an electromagnetic resonance phenomenon, the flowmeter capable of being installed at any point desired by a user, rather than at a joint of a pipe.

2. Description of the Related Art

Technology for accurately measuring the flow of water or other types of liquid in real time is essential in various fields, such as the environmental field, the chemical field, the medical field, and the like. Currently, technology for measuring flow may be categorized into a measurement method using the differential pressure, variable area, linear movement, and the like of fluid passing through a flowmeter, a method of measuring the mass of fluid, a method of measuring the magnitude of the electromotive force that is generated in the direction perpendicular to the movement of fluid in a magnetic field or analyzing the fluid using ultrasound, and the like.

Here, in the case of the measurement method using the differential pressure of fluid, the method of measuring the mass of fluid, and the method of measuring the linear movement of fluid, it is necessary to install a measurement sensor between pipes in which fluid flows, in which case the fluid must pass through the measurement sensor.

However, it may be difficult to install a measurement sensor along a flow path due to the length or size of the flow path, and it is necessary to regularly check whether leakage occurs.

Also, in the case of an electromagnetic method, because electromagnetic force is used as a measurement signal, the fluid itself must be a conductor. Further, when a pipe is made of metal, an additional signal-processing method is required, and a signal may be changed when the conductivity of the fluid flowing in the pipe changes.

DOCUMENTS OF RELATED ART (Patent Document 1) Korean Utility Model Registration No. 0125883, published on Aug. 17, 1992 and titled "Mass flow controller including flowmeter".

SUMMARY OF THE INVENTION

An object of the present invention is to provide a flowmeter that may be easily installed at any desired point on a pipe and easily uninstalled therefrom without cutting the pipe.

Another object of the present invention is to solve a problem with a flow measurement device based on electromagnetic force, such as the conductivity of fluid and high electric power.

A further object of the present invention is to provide a flowmeter that may solve a problem, such as the contamination of fluid, the inflow of impurities, or the like, by preventing the flowmeter from coming into contact with the fluid flowing in a flow path, such as a pipe or a tube.

In order to accomplish the above objects, a flowmeter using an electromagnetic resonance phenomenon according to the present invention includes an RF resonator in the form of a cylinder, into which a transmission antenna for forming a magnetic field in a preset frequency range and a reception antenna for measuring a response signal are inserted, the RF resonator being shielded from an external magnetic field; and a processor for measuring flow in a pipe that passes through the RF resonator based on the response signal. The RF resonator may include a circular hole in each of the two bases of the cylinder so as to enable the pipe to pass through the RF resonator and may be formed with a first body and a second body, split along the height direction of the cylinder, the first body and the second body being coupled to each other using a coupling member so as to wrap the outer circumferential surface of the pipe.

Here, the RF resonator may be made of aluminum or brass.

Here, a first diameter corresponding to the circular hole may be set in consideration of at least one of the outer diameter of the pipe and a frequency range of electromagnetic radiation that is capable of being absorbed by the liquid flowing in the pipe.

Here, a second diameter corresponding to each of the two bases may be set so as to match a preset ratio of the first diameter and the second diameter.

Here, the length of the transmission antenna and that of the reception antenna may be set in consideration of the wavelength of the magnetic field in the preset frequency range, and the diameter of the transmission antenna and that of the reception antenna may be set in consideration of the first diameter.

Here, the coupling member may be attached to a part at which the lateral surface of the cylinder is cut and may be prevented from protruding into the inner space of the cylinder in which the magnetic field in the preset frequency range is formed.

Here, the RF resonator may further include two antenna insertion holes through which the transmission antenna and the reception antenna are inserted.

Here, the transmission antenna and the reception antenna may be inserted so as to be prevented from coming into contact with the surface of the RF resonator.

Here, the processor may calculate a permittivity of the liquid flowing in the pipe based on the response signal and measure the flow based on the permittivity.

Here, the processor may calculate the permittivity based on the difference between a first voltage, corresponding to an electromagnetic wave applied to the transmission antenna, and a second voltage, corresponding to the response signal.

Also, a method for measuring flow using an electromagnetic resonance phenomenon according to an embodiment of the present invention includes applying an electromagnetic wave to a transmission antenna inserted into an RF resonator, which is shielded from an external magnetic field, thereby forming a magnetic field in a preset frequency range inside the RF resonator; measuring a response signal from the liquid passing through the RF resonator in a pipe using a reception antenna inserted into the RF resonator; and measuring the flow in the pipe based on the response signal. The RF resonator in the form of a cylinder may include a circular hole in each of the two bases of the cylinder so as to enable the pipe to pass through the RF resonator, and may be formed with a first body and a second body split along the height direction of the cylinder, the first body and the second body being coupled to each other using a coupling member so as to wrap the outer circumferential surface of the pipe.

Here, the RF resonator may be made of aluminum or brass.

Here, a first diameter corresponding to the circular hole may be set in consideration of at least one of the outer diameter of the pipe and a frequency range of electromagnetic radiation that is capable of being absorbed by the liquid flowing in the pipe.

Here, a second diameter corresponding to each of the two bases may be set so as to match a preset ratio of the first diameter and the second diameter.

Here, the length of the transmission antenna and that of the reception antenna may be set in consideration of the wavelength of the magnetic field in the preset frequency range, and the diameter of the transmission antenna and that of the reception antenna may be set in consideration of the first diameter.

Here, the coupling member may be attached to a part at which the lateral surface of the cylinder is cut and may be prevented from protruding into the inner space of the cylinder in which the magnetic field in the preset frequency range is formed.

Here, the RF resonator may further include two antenna insertion holes through which the transmission antenna and the reception antenna are inserted.

Here, the transmission antenna and the reception antenna may be inserted so as to be prevented from coming into contact with the surface of the RF resonator.

Here, measuring the flow may be configured to calculate a permittivity of the liquid flowing in the pipe based on the response signal and to measure the flow based on the permittivity.

Here, measuring the flow may be configured to calculate the permittivity based on the difference between a first voltage, corresponding to the electromagnetic wave applied to the transmission antenna, and a second voltage, corresponding to the response signal.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations which have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment of the present invention will be described in detail with reference to the accompanying drawings.

Figure 1:
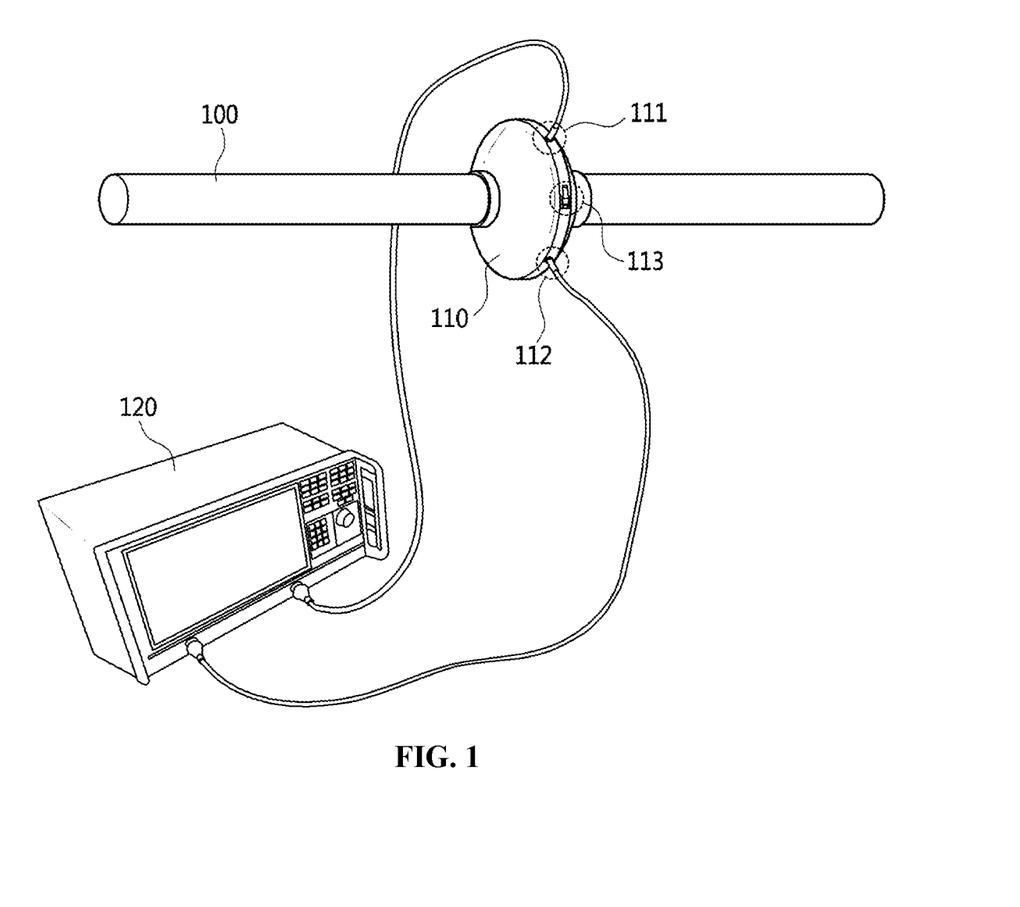
FIG. 1 is a view that shows a flowmeter using an electromagnetic resonance phenomenon according to an embodiment of the present invention.

FIG. 1 is a view that shows a flowmeter using an electromagnetic resonance phenomenon according to an embodiment of the present invention.

Hereinafter, a flowmeter based on a permittivity, which is one of the basic characteristics of a liquid, is proposed, rather than a measurement method using pressure, mass, or volume. Also, for the convenience of description, the target, the flow of which is to be measured using a flowmeter according to an embodiment of the present invention, may be water.

Referring to FIG. 1, the flowmeter using an electromagnetic resonance phenomenon according to an embodiment of the present invention includes an RF resonator 110 and a processor 120.

The RF resonator 110 in the form of a cylinder is shielded from an external magnetic field, and a transmission antenna for forming a magnetic field in a preset frequency range and a reception antenna for measuring a response signal may be inserted into the cylinder.

Here, the RF resonator 110 is made of aluminum or brass. Accordingly, the RF resonator 110 is not affected by an external magnetic field, and an electromagnetic wave, applied to the interior thereof using the transmission antenna, is prevented from escaping therefrom, whereby a magnetic field in a preset frequency range may be formed inside the RF resonator 110.

For example, the RF resonator 110 may have a circular hole in each of the two bases of the cylinder so as to enable a pipe 100 in which water flows to pass through the RF resonator 110, as shown in FIG. 1.

Also, the RF resonator 110 includes a first body and a second body, which are split along the height direction of the cylinder, and the first body and the second body may be coupled to each other using a coupling member so as to wrap the outer circumferential surface of the pipe 100.

Figure 2:
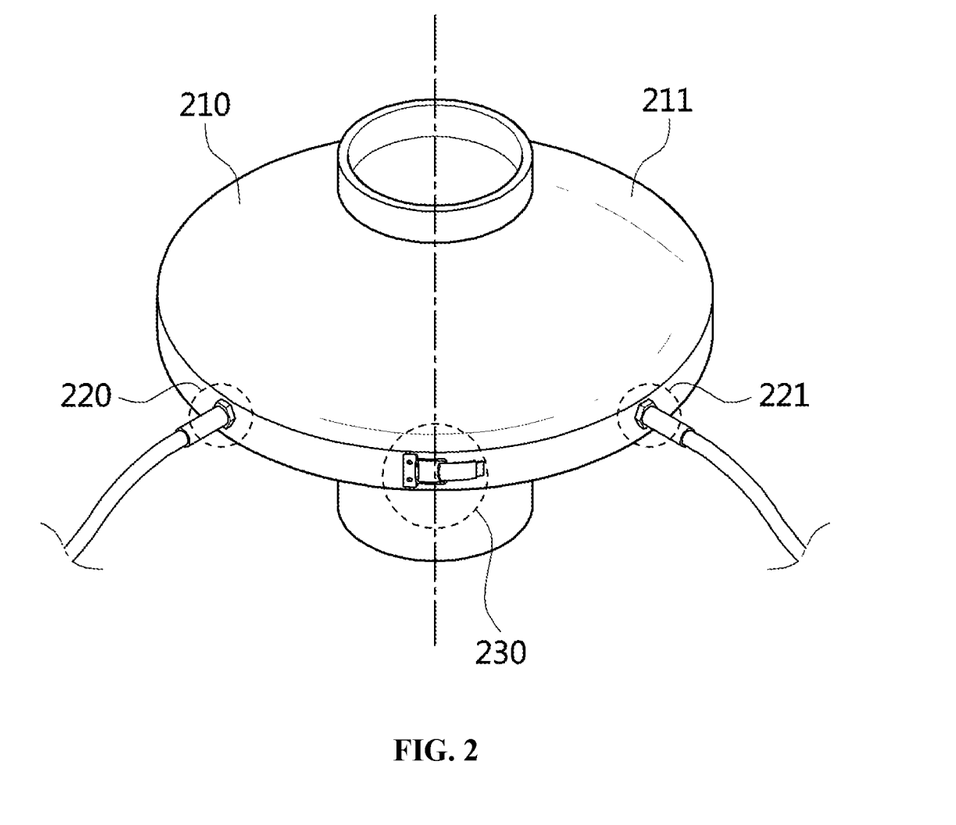
FIGS. 2 to 5 are views that show an example of an RF resonator according to the present invention.
Figure 3:
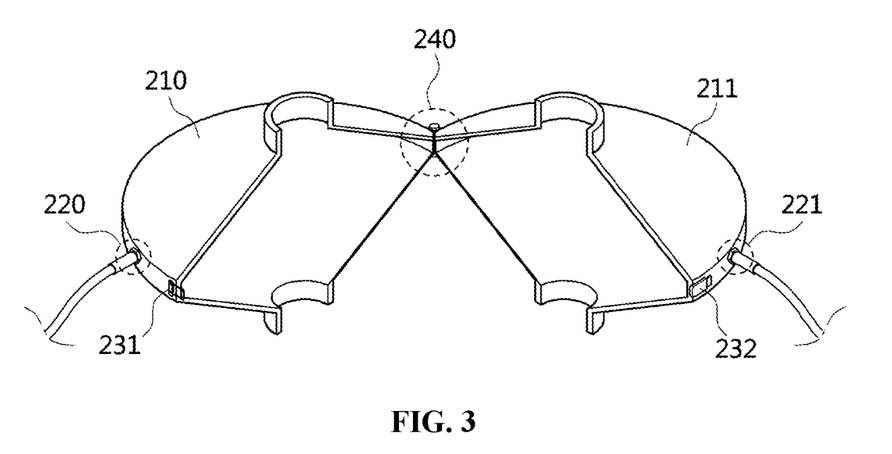

For example, referring to FIG. 2, the RF resonator may be split into a first body 210 and a second body 211, and the first and second bodies may be coupled to each other using a coupling member 230 in the form of a latch. That is, when the coupling member 230 is unlatched, the first body 210 and the second body 211 of the RF resonator may be separated from each other, as shown in FIG. 3, and the RF resonator may be installed so as to wrap the outer circumferential surface of the pipe 100, as shown in FIG. 1, through the separated parts shown in FIG. 3.

Accordingly, a flowmeter may be installed at a desired position without cutting the long pipe 100 shown in FIG. 1 using the RF resonator according to an embodiment of the present invention.

Figure 4:
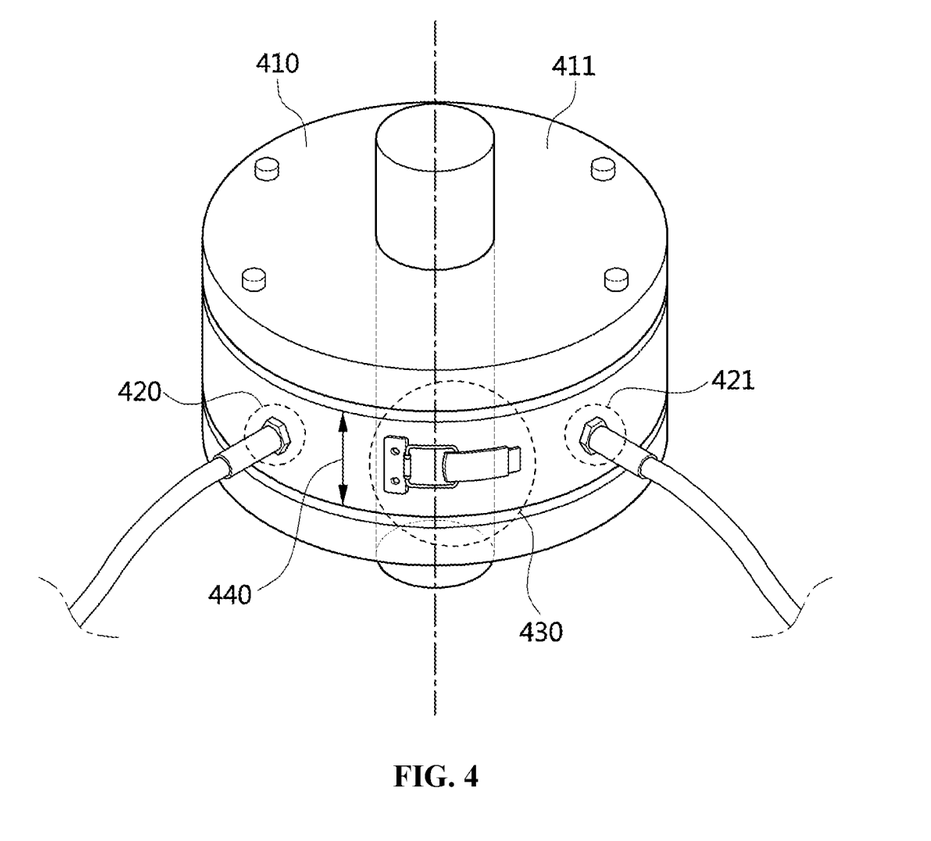
Figure 5:
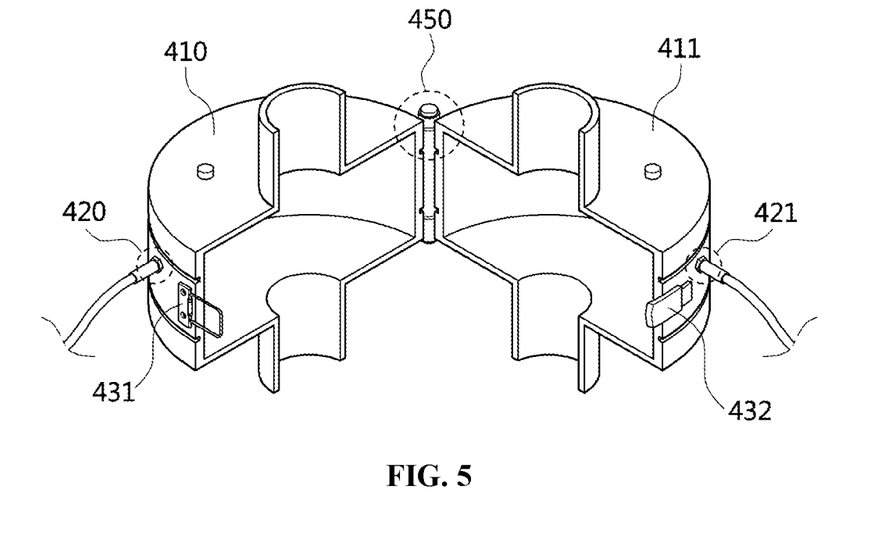

In another example, the RF resonator according to the present invention may be formed so as to have the structure shown in FIG. 4, and may be split into a first body 410 and a second body 411 as shown in FIG. 5, thereby being installed so as to wrap the pipe 100 illustrated in FIG. 1.

Here, the RF resonator 110 may further include two antenna insertion holes 111 and 112 for inserting a transmission antenna and a reception antenna.

For example, respective antenna insertion holes 220 and 221 may be provided in the first body 210 and the second body 211 of the RF resonator, which is split as shown in FIGS. 2 to 3, and the transmission antenna and the reception antenna may be inserted through the antenna insertion holes 220 and 221.

In another example, respective antenna insertion holes 420 and 421 may be provided in the first body 410 and the second body 411 of the RF resonator having the shape illustrated in FIGS. 4 to 5.

Here, a first diameter, which is the diameter of the circular hole, may be set in consideration of at least one of the outer diameter of the pipe 100 and the frequency range of electromagnetic radiation that can be absorbed by the liquid flowing in the pipe 100.

If the transmission antenna generates an electromagnetic wave having a fixed strength, the frequency of the magnetic field formed inside the RF resonator may decrease with an increase in the first diameter, which is the diameter of the circular hole in the RF resonator.

For example, if the frequency of a magnetic field formed inside the RF resonator is 1.1 GHz (+/−10%) when the first diameter is 10 cm, the frequency of the magnetic field formed inside the RF resonator may decrease by 29.5 MHz each time the first diameter increases by 1 cm. That is, when the first diameter is 11 cm, the frequency of the magnetic field formed inside the RF resonator may be about 1.07 GHz, and when the first diameter is 36 cm, the frequency of the magnetic field formed inside the RF resonator may be about 360 MHz. However, because the electromagnetic spectrum that can be absorbed by water, the flow of which is to be measured, is equal to or higher than 800 MHz, the maximum size of the first diameter may be limited to 20 cm.

Using the above example, the first diameter of the flowmeter to be installed in a pipe having an outer diameter of 10 cm may fall within a range of 10 cm to 20 cm.

Figure 6:
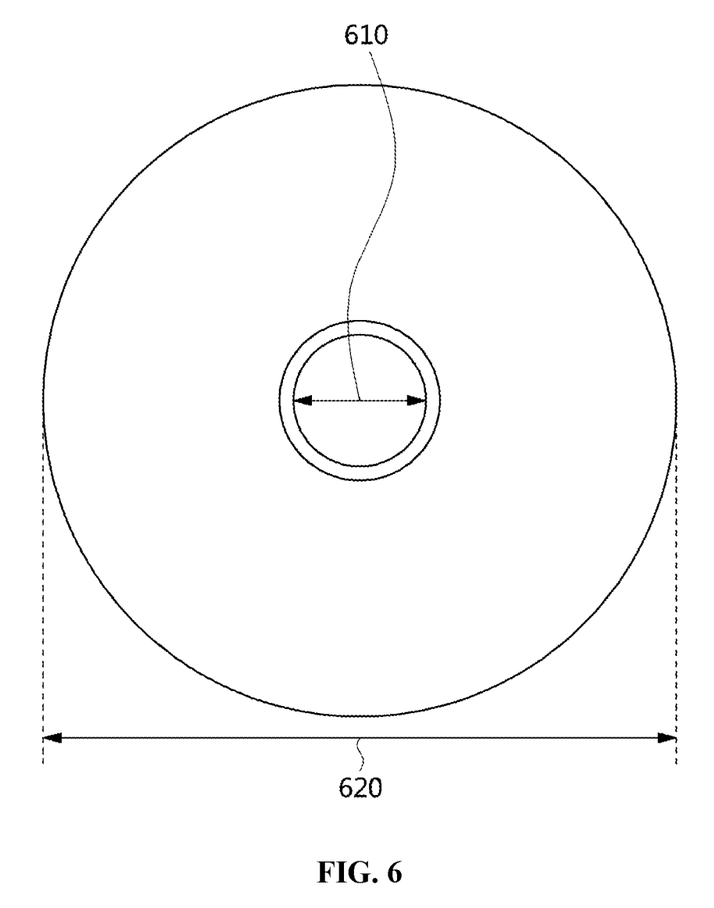
FIG. 6 is a view that shows an example of the first diameter and the second diameter of an RF resonator according to the present invention.

Here, a second diameter, which is the diameter of each of the two bases of the cylinder, may be set so as to match a preset ratio of the first diameter to the second diameter.

For example, the ratio of the first diameter to the second diameter may be set to 1:2 or 1:3. That is, when the first diameter, which is the diameter of the circular hole in the RF resonator, is 10 cm, the second diameter, which is the diameter of the entire RF resonator, may be set to 20 cm or 30 cm.

Accordingly, when the RF resonator according to an embodiment of the present invention is designed, the first diameter and the second diameter may be set such that the frequency of the magnetic field formed inside the RF resonator falls within the range of 0.9 GHz±0.2 GHz, which is known to be the frequency range of electromagnetic radiation that water can absorb the most.

In the present invention, the process of designing an RF resonator is described on the assumption that the flow of water is measured, but an RF resonator may be designed such that the frequency of an electromagnetic field formed inside the RF resonator falls within the electromagnetic spectrum that can be absorbed the most by the target fluid, the flow of which is to be measured.

Here, an electromagnetic field in a preset frequency range is formed inside the RF resonator 110 shown in FIG. 1, and two antennas, which are a transmission antenna and a reception antenna, must be installed in the RF resonator 110 in order to obtain a response signal from water or liquid flowing in the pipe 100.

Here, any of various types of antennas may be used in consideration of the type or amount of fluid flowing in the pipe 100. For example, in order to measure the flow of water, enamel copper wire may be connected to an SMA adapter, which is provided for extending an antenna, in the present invention.

Also, the material of an antenna may be silver wire or copper wire without a sheath, but wire covered with a sheath may be used when a problem of oxidization of wire occurs.

These transmission and reception antennas may be inserted into the RF resonator through antenna insertion holes 111 and 112 in the RF resonator, and may be fixed using an SMA adapter. Here, the SMA adapter for fixing the antenna may be installed so as to minimally protrude into the inner space of the RF resonator, whereby only the antennas may be inserted into the RF resonator if possible.

Here, the lengths of the transmission antenna and the reception antenna may be set in consideration of the wavelength of the magnetic field formed in a preset frequency range.

For example, the lengths of the transmission antenna and the reception antenna may be set inversely proportional to the wavelength so as to be ½ or ¼ thereof.

Here, the diameters of the transmission antenna and the reception antenna may be set in consideration of the first diameter.

For example, in the case of the RF resonator, the first diameter of which is 10 cm, enamel copper wire wound in the shape of a coil having a diameter of 1 cm may be used as the transmission antenna and the reception antenna.

Here, the transmission antenna and the reception antenna may be inserted such that they are not in contact with the surface of the RF resonator. That is, because the two antennas are produced using silver wire or copper wire, if they come into contact with the surface of the RF resonator, an error may be caused when a response signal is measured. Therefore, the two antennas according to an embodiment of the present invention may be inserted such that they are not in contact with the surface of the RF resonator.

Here, referring to FIG. 4, each of the two antennas to be inserted into the RF resonator is produced such that the diameter thereof does not exceed the maximum inner width 440 of the RF resonator, thereby being prevented from coming into contact with the surface of the RF resonator.

Figure 10:
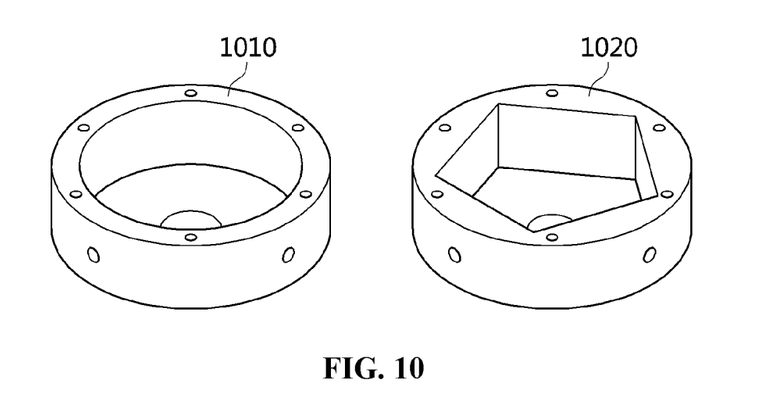
FIG. 10 is a view that shows an example of the inner structure of an RF resonator according to the present invention.

Also, referring to FIG. 10, the RF resonator 1010 or 1020 according to an embodiment of the present invention may be produced so as to have an empty inner space having a cylindrical shape or a pentagonal pillar shape. For example, the RF resonator 1020 produced so as to have an empty inner space in a pentagonal pillar shape may form an electromagnetic field in a preset frequency range therein.

Here, a coupling member 113 is attached to a part on the lateral surface of the cylinder at which the cylinder is cut, thereby being prevented from protruding into the cylinder in which a magnetic field in a preset frequency range is formed.

Figure 7:
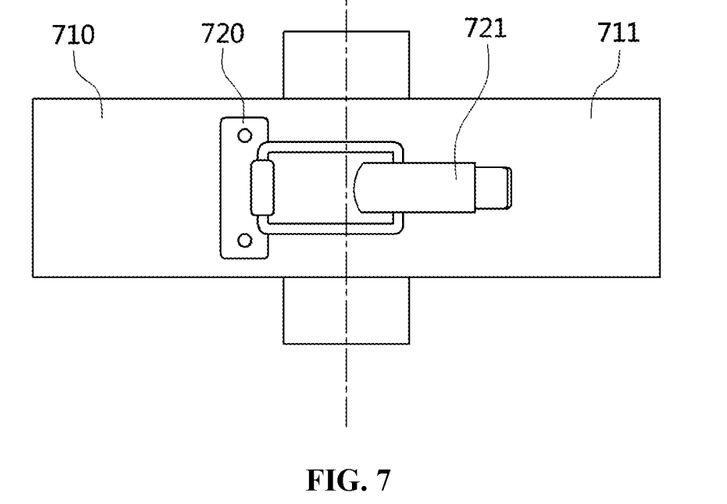
FIGS. 7 to 9 are views that show an example of the position at which a coupling member according to the present invention is attached to an RF resonator.

Here, referring to FIG. 7, the coupling members 720 and 721 according to an embodiment of the present invention may be provided to the first body 710 and the second body 711 of the RF resonator, respectively, so that the cross sections thereof are completely coupled to each other.

Also, according to the present invention, the coupling members for coupling the split parts of the RF resonator may be attached such that they do not protrude into the inner space of the RF resonator. That is, when the split first body and second body are coupled using a part such as a screw or the like, a bolt or a nut protruding into the inner space of the RF resonator may affect the characteristics of a signal. Therefore, the coupling members may be formed so as to be fastened outside the RF resonator.

Figure 8:
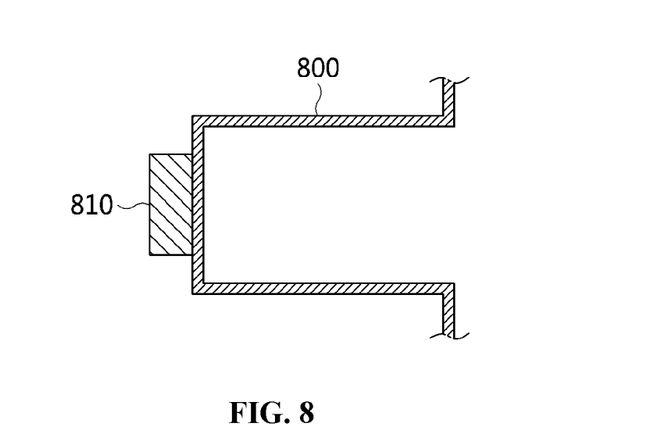
Figure 9:
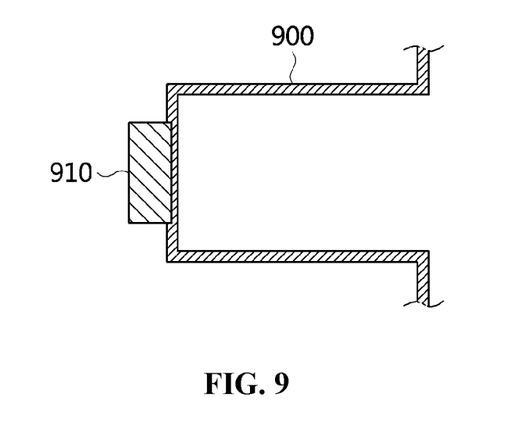

For example, the coupling member 810 may be formed by being attached to the external surface of the RF resonator 800, as shown in FIG. 8, or may be formed such that a portion thereof is embedded into the external surface of the RF resonator 900, as shown in FIG. 9.

Here, the coupling member according to the present invention is not limited to the form illustrated in FIG. 7, and may be provided so as not to protrude into the inner space of the RF resonator 800 or 900, as shown in FIG. 8 or FIG. 9.

The processor 120 measures the flow of fluid passing through the RF resonator 110 in the pipe 100 based on a response signal.

Here, the permittivity of the liquid flowing in the pipe 100 is calculated based on the response signal, and the flow may be measured based on the permittivity.

Here, a permittivity is a measure indicative of the degree to which an entity is polarized in response to an electromagnetic field applied thereto, and may be a frequency-dependent characteristic. Accordingly, when an electromagnetic field in a certain frequency range is formed inside the RF resonator 110, which is shielded from an external magnetic field, the energy generated by the electromagnetic field may be absorbed in an amount proportional to the amount of liquid flowing in the pipe 100.

Here, in order to measure the amount of energy absorbed by the liquid flowing in the pipe 100, a decrease in the strength of a magnetic field at a certain frequency or a change in the frequency of the applied electromagnetic wave may be measured.

Figure 11:
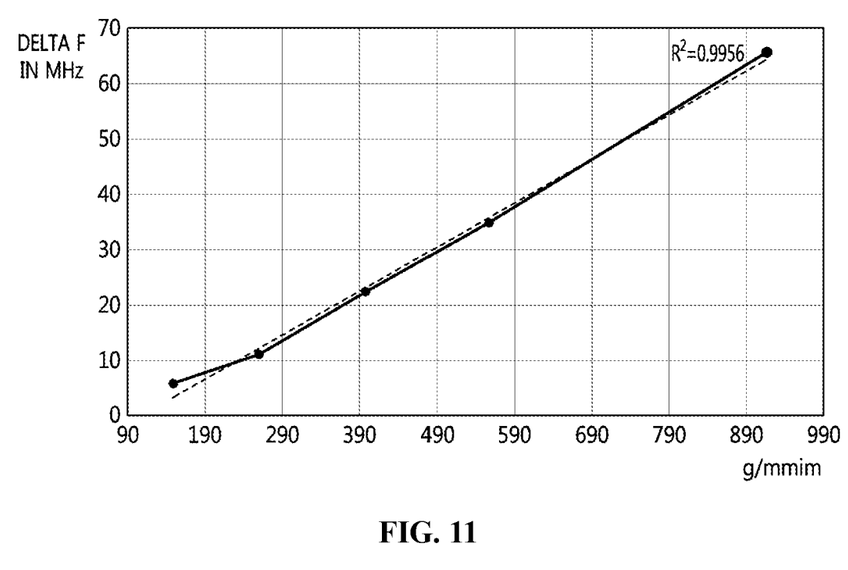
FIG. 11 is a view that shows an example of the result of a flow measurement experiment using a flowmeter according to the present invention.

FIG. 11 may be measurement data obtained by conducting a flow measurement experiment using a flowmeter according to an embodiment of the present invention. In the measurement experiment, a signal was applied to the interior of an RF resonator using a tracking generator from Signal Hound corporation in the U.S., and the change in a signal (delta frequency) and the decrease in the magnitude of the signal attributable to water flowing in the pipe were measured using a real-time spectrum analyzer. Here, tubing having an inner diameter of 7.9 mm and an outer diameter of 11.1 mm, produced by LabSciTech corporation, was used, and water was supplied to the tubing using a controlled volume pump from KNF corporation, which is capable of phased speed control. Then, the pumping rate of water was gradually sped up, and the result of measuring the weight of the water and calculating the same in units of g/min is illustrated in the graph of FIG. 11. Referring to FIG. 11, when there was no water passing through the tubing, the frequency of the magnetic field inside the RF resonator was measured to be 1.076 GHz. However, with an increase in the amount of water passing through the tubing, the frequency of the magnetic field inside the RF resonator changed to about 0.980 GHz.

That is, it may be confirmed that the spectrum measured as a response signal is changed with variation in flow. The present invention may provide a flowmeter that measures flow using this change.

Here, a permittivity may be calculated based on the difference between a first voltage, which corresponds to an electromagnetic wave applied to the transmission antenna, and a second voltage, which corresponds to a response signal.

Also, although not illustrated in FIG. 1, the flowmeter using an electromagnetic resonance phenomenon according to an embodiment of the present invention may store various kinds of information generated during the above-described process of measuring flow in a separate storage module.

Through the above-described flowmeter, flow may be measured at any point desired by a user without cutting a pipe.

Also, because flow is measured without contact with fluid passing along a flow path, problems, such as the contamination of fluid, the inflow of impurities, and the like, may be avoided.

Figure 12:
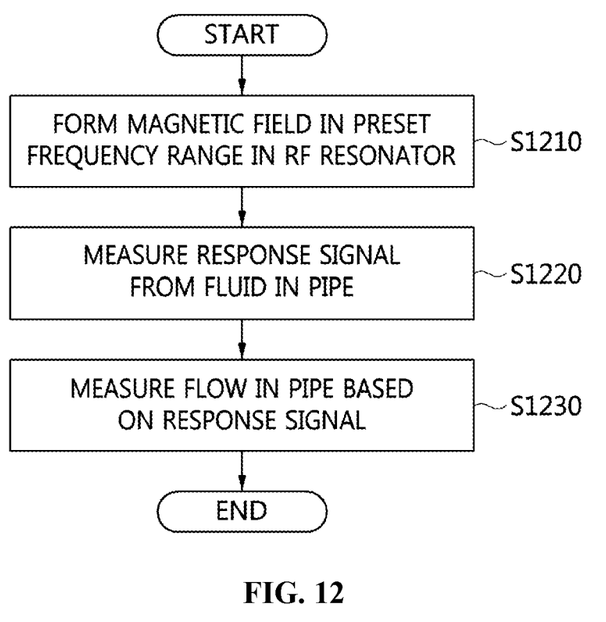
FIG. 12 is a flowchart that shows a method for measuring flow using an electromagnetic resonance phenomenon according to an embodiment of the present invention.

FIG. 12 is a flowchart that shows a method for measuring flow using an electromagnetic resonance phenomenon according to an embodiment of the present invention.

Hereinafter, a method for measuring flow based on a permittivity, which is one of the basic characteristics of a liquid, is proposed, rather than a method using pressure, mass, or volume. Also, for the convenience of description, the target, the flow of which is to be measured using a flowmeter according to an embodiment of the present invention, may be water.

Referring to FIG. 12, in the method for measuring flow using an electromagnetic resonance phenomenon according to an embodiment of the present invention, a magnetic field in a preset frequency range is formed inside an RF resonator at step S1210 by applying an electromagnetic wave using a transmission antenna inserted into the RF resonator, which is shielded from an external magnetic field.

The RF resonator 110 in the form of a cylinder, into which a transmission antenna for forming a magnetic field in a preset frequency range and a reception antenna for measuring a response signal are inserted, may be shielded from an external magnetic field.

Here, the RF resonator 110 may be made of aluminum or brass. Accordingly, the inner space of the RF resonator 110 is not affected by an external magnetic field, and an electromagnetic wave, applied to the interior of the RF resonator 110 using the transmission antenna, is prevented from escaping therefrom, whereby a magnetic field in a preset frequency range may be formed inside the RF resonator 110.

For example, the RF resonator 110 may have a circular hole in each of the two bases of the cylinder so as to enable a pipe 100 in which water flows to pass through the RF resonator 110, as shown in FIG. 1.

Also, the RF resonator 110 includes a first body and a second body, which are split along the height direction of the cylinder, and the first body and the second body may be coupled to each other using a coupling member so as to wrap the outer circumferential surface of the pipe 100.

For example, referring to FIG. 2, the RF resonator may be split into a first body 210 and a second body 211, and the first and second bodies may be coupled to each other using a coupling member 230 in the form of a latch. That is, when the coupling member 230 is unlatched, the first body 210 and the second body 211 of the RF resonator may be separated from each other, as shown in FIG. 3, and the RF resonator may be installed so as to wrap the outer circumferential surface of the pipe 100, as shown in FIG. 1, through the separated parts shown in FIG. 3.

Accordingly, using the RF resonator according to an embodiment of the present invention, a flowmeter may be installed at a desired position without cutting the long pipe 100 shown in FIG. 1.

In another example, the RF resonator according to the present invention may be formed so as to have the structure shown in FIG. 4, and may be split into a first body 410 and a second body 411, as shown in FIG. 5, thereby being installed so as to wrap the pipe 100 illustrated in FIG. 1.

Here, the RF resonator 110 may further include two antenna insertion holes for inserting a transmission antenna and a reception antenna.

For example, respective antenna insertion holes 220 and 221 may be provided in the first body 210 and the second body 211 of the RF resonator, which is split as shown in FIGS. 2 to 3, and the transmission antenna and the reception antenna may be inserted through the antenna insertion holes 220 and 221.

In another example, respective antenna insertion holes 420 and 421 may be provided in the first body 410 and the second body 411 of the RF resonator having the shape illustrated in FIGS. 4 to 5.

Here, a first diameter, which is the diameter of the circular hole, may be set in consideration of at least one of the outer diameter of the pipe and the electromagnetic spectrum that can be absorbed by the liquid flowing in the pipe.

If the transmission antenna generates an electromagnetic wave having a fixed strength, the frequency of the magnetic field formed inside the RF resonator may decrease with an increase in the first diameter, which is the diameter of the circular hole in the RF resonator.

For example, if the frequency of a magnetic field formed inside the RF resonator is 1.1 GHz (+/−10%) when the first diameter is 10 cm, the frequency of the magnetic field formed inside the RF resonator may decrease by 29.5 MHz each time the first diameter increases by 1 cm. That is, when the first diameter is 11 cm, the frequency of the magnetic field formed inside the RF resonator may be about 1.07 GHz, and when the first diameter is 36 cm, the frequency of the magnetic field formed inside the RF resonator may be about 360 MHz. However, because the electromagnetic spectrum that can be absorbed by water, the flow of which is to be measured, is equal to or higher than 800 MHz, the maximum size of the first diameter may be limited to 20 cm.

Using the above example, the first diameter of the flowmeter to be installed in a pipe having an outer diameter of 10 cm may fall within a range of 10 cm to 20 cm.

Here, a second diameter, which is the diameter of each of the two bases of the cylinder, may be set so as to match a preset ratio of the first diameter to the second diameter.

For example, the ratio of the first diameter to the second diameter may be set to 1:2 or 1:3. That is, when the first diameter, which is the diameter of the circular hole in the RF resonator, is 10 cm, the second diameter, which is the diameter of the entire RF resonator, may be set to 20 cm or 30 cm.

Accordingly, when the RF resonator according to an embodiment of the present invention is designed, the first diameter and the second diameter may be set such that the frequency of the magnetic field formed inside the RF resonator falls within the range of 0.9 GHz±0.2 GHz, which is known to be the frequency range of electromagnetic radiation that water can absorb the most.

In the present invention, the process of designing an RF resonator is described on the assumption that the flow of water is measured, but an RF resonator may be designed such that the frequency of an electromagnetic field formed inside the RF resonator falls within the electromagnetic spectrum that can be absorbed the most by the target fluid, the flow of which is to be measured.

Here, an electromagnetic field in a preset frequency range is formed inside the RF resonator, and two antennas, which are a transmission antenna and a reception antenna, must be installed in the RF resonator in order to obtain a response signal from water or liquid flowing in the pipe.

Here, any of various types of antennas may be used in consideration of the type or amount of fluid flowing in the pipe. For example, in order to measure the flow of water, enamel copper wire may be connected to an SMA adapter, which is provided for extending an antenna, in the present invention.

Also, the material of an antenna may be silver wire or copper wire without a sheath, but wire covered with a sheath may be used when a problem of oxidization of wire occurs.

These transmission and reception antennas may be inserted into the RF resonator through antenna insertion holes in the RF resonator, and may be fixed using an SMA adapter. Here, the SMA adapter for fixing the antenna may be installed so as to minimally protrude into the inner space of the RF resonator, whereby only the antennas may be inserted into the RF resonator if possible.

Here, the lengths of the transmission antenna and the reception antenna may be set in consideration of the wavelength of the magnetic field formed in a preset frequency range.

For example, the lengths of the transmission antenna and the reception antenna may be set inversely proportional to the wavelength so as to be ½ or ¼ thereof.

Here, the diameters of the transmission antenna and the reception antenna may be set in consideration of the first diameter.

For example, in the case of the RF resonator, the first diameter of which is 10 cm, enamel copper wire wound in the shape of a coil having a diameter of 1 cm may be used as the transmission antenna and the reception antenna.

Here, the transmission antenna and the reception antenna may be inserted such that they are not in contact with the surface of the RF resonator. That is, because the two antennas are produced using silver wire or copper wire, if they come into contact with the surface of the RF resonator, an error may be caused when a response signal is measured. Therefore, the two antennas according to an embodiment of the present invention may be inserted such that they are not in contact with the surface of the RF resonator.

Here, referring to FIG. 4, each of the two antennas to be inserted into the RF resonator is produced such that the diameter thereof does not exceed the maximum inner width 440 of the RF resonator, thereby being prevented from coming into contact with the surface of the RF resonator.

Also, referring to FIG. 10, the RF resonator 1010 or 1020 according to an embodiment of the present invention may be produced so as to have an empty inner space having a cylindrical shape or a pentagonal pillar shape. For example, the RF resonator 1020 that is produced so as to have an empty inner space in a pentagonal pillar shape may form an electromagnetic field in a preset frequency range therein.

Here, a coupling member is attached to a position on the lateral surface of the cylinder at which the cylinder is split, thereby being prevented from protruding into the inner space of the cylinder in which a magnetic field in a preset frequency range is formed.

Here, referring to FIG. 7, the coupling members 720 and 721 according to an embodiment of the present invention may be provided to the first body 710 and the second body 711 of the RF resonator, respectively, so that the cross sections thereof are completely coupled to each other.

Also, according to the present invention, the coupling members for coupling the split parts of the RF resonator may be attached such that they do not protrude into the inner space of the RF resonator. That is, when the split first body and second body are coupled using a part such as a screw or the like, a bolt or a nut protruding into the inner space of the RF resonator may affect the characteristics of a signal. Therefore, the coupling members may be formed so as to be fastened outside the RF resonator.

For example, the coupling member 810 may be formed by being attached to the external surface of the RF resonator 800, as shown in FIG. 8, or may be formed such that a portion thereof is embedded into the external surface of the RF resonator 900, as shown in FIG. 9.

Here, the coupling member according to the present invention is not limited to the form illustrated in FIG. 7, and may be provided so as not to protrude into the inner space of the RF resonator 800 or 900, as shown in FIG. 8 or FIG. 9.

Also, in the method for measuring flow using an electromagnetic resonance phenomenon according to an embodiment of the present invention, a response signal from fluid passing through the RF resonator in the pipe is measured at step S1220 using the reception antenna inserted into the RF resonator.

Here, the permittivity of the liquid flowing in the pipe is calculated based on the response signal, and the flow may be measured based on the permittivity.

Here, a permittivity is a measure indicative of the degree to which an entity is polarized in response to an electromagnetic field applied thereto, and may be a frequency-dependent characteristic. Accordingly, when an electromagnetic field in a certain frequency range is formed inside the RF resonator 110, which is shielded from an external magnetic field, the energy generated by the electromagnetic field may be absorbed in an amount proportional to the amount of liquid flowing in the pipe 100.

Here, the permittivity may be calculated based on the difference between a first voltage, which corresponds to the electromagnetic wave applied to the transmission antenna, and a second voltage, which corresponds to the response signal.

Also, in the method for measuring flow using an electromagnetic resonance phenomenon according to an embodiment of the present invention, the flow in the pipe is measured at step S1230 based on the response signal.

Here, in order to measure the amount of energy absorbed by the liquid flowing in the pipe, a decrease in the strength of a magnetic field at a certain frequency or a change in the frequency of the applied electromagnetic wave may be measured.

Here, FIG. 11 may be measurement data obtained by conducting a flow measurement experiment using a flowmeter according to an embodiment of the present invention. In the measurement experiment, a signal was applied to the interior of an RF resonator using a tracking generator from Signal Hound corporation in the U.S., and the change in a signal (delta frequency) and the decrease in the magnitude of the signal attributable to water flowing in the pipe were measured using a real-time spectrum analyzer. Here, tubing, having an inner diameter of 7.9 mm and an outer diameter of 11.1 mm, which is a product of LabSciTech corporation, was used, and water was supplied to the tubing using a controlled volume pump from KNF corporation, which is capable of phased speed control. Then, the pumping rate of water was gradually sped up, and the result of measuring the weight of the water and calculating the same in units of g/min is illustrated in the graph of FIG. 11. Referring to FIG. 11, when there was no water passing through the tubing, the frequency of the magnetic field inside the RF resonator was measured to be 1.076 GHz. However, with an increase in the amount of water passing through the tubing, the frequency of the magnetic field inside the RF resonator changed to about 0.980 GHz.

That is, it may be confirmed that the spectrum measured as a response signal is changed with variation in flow. The present invention measures flow using this change.

Also, although not illustrated in FIG. 12, in the method for measuring flow using an electromagnetic resonance phenomenon according to an embodiment of the present invention, various kinds of information generated during the above-described process of measuring flow may be stored in a separate storage module.

Through the above-described flow measurement method, flow may be measured at any desired point without cutting a pipe.

Also, flow is measured without contact with fluid passing along a flow path, whereby problems, such as the contamination of fluid, the inflow of impurities, and the like, may be avoided.

According to the present invention, there may be provided a flowmeter that is easily installed at any desired point on a pipe and is easily uninstalled therefrom without cutting the pipe.

Also, according to the present invention, a problem with a flow measurement device based on electromagnetic force, such as the conductivity of fluid and high electric power, may be solved.

Also, the present invention may provide a flowmeter that may avoid a problem, such as the contamination of fluid, the inflow of impurities, or the like, by preventing the flowmeter from coming into contact with fluid flowing in a flow path, such as a pipe or a tube.

As described above, the apparatus and method for measuring flow using an electromagnetic resonance phenomenon according to the present invention are not limitedly applied to the configurations and operations of the above-described embodiments, but all or some of the embodiments may be selectively combined and configured, so that the embodiments may be modified in various ways.

What is claimed is:

1. A flowmeter using an electromagnetic resonance phenomenon, comprising:
    an RF resonator in a form of a cylinder, into which a transmission antenna for forming a magnetic field in a preset frequency range and a reception antenna for measuring a response signal are inserted, the RF resonator being shielded from an external magnetic field; and
    a processor for measuring flow in a pipe that passes through the RF resonator based on the response signal, wherein the RF resonator includes a circular hole in each of two bases of the cylinder so as to enable the pipe to pass through the RF resonator and is formed with a first body and a second body, split along a height direction of the cylinder, the first body and the second body being coupled to each other using a coupling member so as to wrap an outer circumferential surface of the pipe.

2. The flowmeter of claim 1, wherein the RF resonator is made of aluminum or brass.

3. The flowmeter of claim 1, wherein a first diameter corresponding to the circular hole is set in consideration of at least one of an outer diameter of the pipe and a frequency range of electromagnetic radiation that is capable of being absorbed by liquid flowing in the pipe.

4. The flowmeter of claim 3, wherein a second diameter corresponding to each of the two bases is set so as to match a preset ratio of the first diameter and the second diameter.

5. The flowmeter of claim 3, wherein:
a length of the transmission antenna and that of the reception antenna are set in consideration of a wavelength of the magnetic field in the preset frequency range, and
a diameter of the transmission antenna and that of the reception antenna are set in consideration of the first diameter.

6. The flowmeter of claim 1, wherein the coupling member is attached to a part at which a lateral surface of the cylinder is cut and is prevented from protruding into an inner space of the cylinder in which the magnetic field in the preset frequency range is formed.

7. The flowmeter of claim 1, wherein the RF resonator further includes two antenna insertion holes through which the transmission antenna and the reception antenna are inserted.

8. The flowmeter of claim 1, wherein the transmission antenna and the reception antenna are inserted so as to be prevented from coming into contact with a surface of the RF resonator.

9. The flowmeter of claim 1, wherein the processor calculates a permittivity of liquid flowing in the pipe based on the response signal and measures the flow based on the permittivity.

10. The flowmeter of claim 9, wherein the processor calculates the permittivity based on a difference between a first voltage, corresponding to an electromagnetic wave applied to the transmission antenna, and a second voltage, corresponding to the response signal.

11. A method for measuring flow using an electromagnetic resonance phenomenon, comprising:
applying an electromagnetic wave to a transmission antenna inserted into an RF resonator, which is shielded from an external magnetic field, thereby forming a magnetic field in a preset frequency range inside the RF resonator;
measuring a response signal from liquid passing through the RF resonator in a pipe using a reception antenna inserted into the RF resonator; and
measuring the flow in the pipe based on the response signal,
wherein the RF resonator in a form of a cylinder includes a circular hole in each of two bases of the cylinder so as to enable the pipe to pass through the RF resonator, and is formed with a first body and a second body split along a height direction of the cylinder, the first body and the second body being coupled to each other using a coupling member so as to wrap an outer circumferential surface of the pipe.

12. The method of claim 11, wherein the RF resonator is made of aluminum or brass.

13. The method of claim 11, wherein a first diameter corresponding to the circular hole is set in consideration of at least one of an outer diameter of the pipe and a frequency range of electromagnetic radiation that is capable of being absorbed by the liquid flowing in the pipe.

14. The method of claim 13, wherein a second diameter corresponding to each of the two bases is set so as to match a preset ratio of the first diameter and the second diameter.

15. The method of claim 13, wherein:
a length of the transmission antenna and that of the reception antenna are set in consideration of a wavelength of the magnetic field in the preset frequency range, and
a diameter of the transmission antenna and that of the reception antenna are set in consideration of the first diameter.

16. The method of claim 11, wherein the coupling member is attached to a part at which a lateral surface of the cylinder is cut and is prevented from protruding into an inner space of the cylinder in which the magnetic field in the preset frequency range is formed.

17. The method of claim 11, wherein the RF resonator further includes two antenna insertion holes through which the transmission antenna and the reception antenna are inserted.

18. The method of claim 11, wherein the transmission antenna and the reception antenna are inserted so as to be prevented from coming into contact with a surface of the RF resonator.

19. The method of claim 11, wherein measuring the flow is configured to calculate a permittivity of the liquid flowing in the pipe based on the response signal and to measure the flow based on the permittivity.

20. The method of claim 19, wherein measuring the flow is configured to calculate the permittivity based on a difference between a first voltage, corresponding to the electromagnetic wave applied to the transmission antenna, and a second voltage, corresponding to the response signal.

* * * * *